US008861020B2

(12) United States Patent
Imamura

(10) Patent No.: US 8,861,020 B2
(45) Date of Patent: Oct. 14, 2014

(54) IMAGE READING APPARATUS, CONTROL METHOD OF IMAGE READING APPARATUS, AND STORAGE MEDIUM

(71) Applicant: Canon Kabushiki Kaisha, Tokyo (JP)

(72) Inventor: Takeru Imamura, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 13/688,076

(22) Filed: Nov. 28, 2012

(65) Prior Publication Data
US 2013/0135654 A1 May 30, 2013

(30) Foreign Application Priority Data
Nov. 30, 2011 (JP) ................................. 2011-262209

(51) Int. Cl.
*H04N 1/00* (2006.01)
*H04N 1/04* (2006.01)
*H04N 1/10* (2006.01)

(52) U.S. Cl.
CPC .......... *H04N 1/00* (2013.01); *H04N 2201/0422* (2013.01); *H04N 1/10* (2013.01); *H04N 1/00469* (2013.01); *H04N 1/00702* (2013.01); *H04N 1/0044* (2013.01); *H04N 1/00734* (2013.01); *H04N 2201/0094* (2013.01); *H04N 1/00748* (2013.01)
USPC ............ 358/1.6; 358/1.13; 358/1.2; 358/474; 358/497; 358/505

(58) Field of Classification Search
CPC .......... H04N 1/00469; H04N 1/00702; H04N 1/00748; H04N 1/00734; H04N 1/10
See application file for complete search history.

(56) References Cited

U.S. PATENT DOCUMENTS

| 4,616,269 | A | * | 10/1986 | Mori .............................. 358/496 |
| 5,311,248 | A | * | 5/1994 | Iwata .............................. 355/61 |
| 6,529,918 | B2 | * | 3/2003 | Takahashi ............................ 1/1 |
| 8,693,044 | B2 | * | 4/2014 | Hayakawa ..................... 358/1.2 |
| 2012/0188589 | A1 | * | 7/2012 | Potter .......................... 358/1.15 |

FOREIGN PATENT DOCUMENTS

JP 2004-219722 A 8/2004

* cited by examiner

*Primary Examiner* — Dov Popovici
(74) *Attorney, Agent, or Firm* — Canon U.S.A., Inc. IP Division

(57) ABSTRACT

There is provided a method for properly placing a document on a reference position of a document positioning plate. The method for controlling an image reading apparatus for reading a document placed on a document positioning plate includes acquiring an image of an image-readable region including the document positioning plate; detecting a document to be read in a vicinity of a reference position for reading the document which is placed on the document positioning plate, and controlling a display unit to display an image of a first region of the document positioning plate in a case where the document is not detected, and controlling the display unit to display an image of a second region in the vicinity of the reference position in a magnification that is greater than a magnification for displaying the image of the first region in a case where the document is detected.

7 Claims, 13 Drawing Sheets

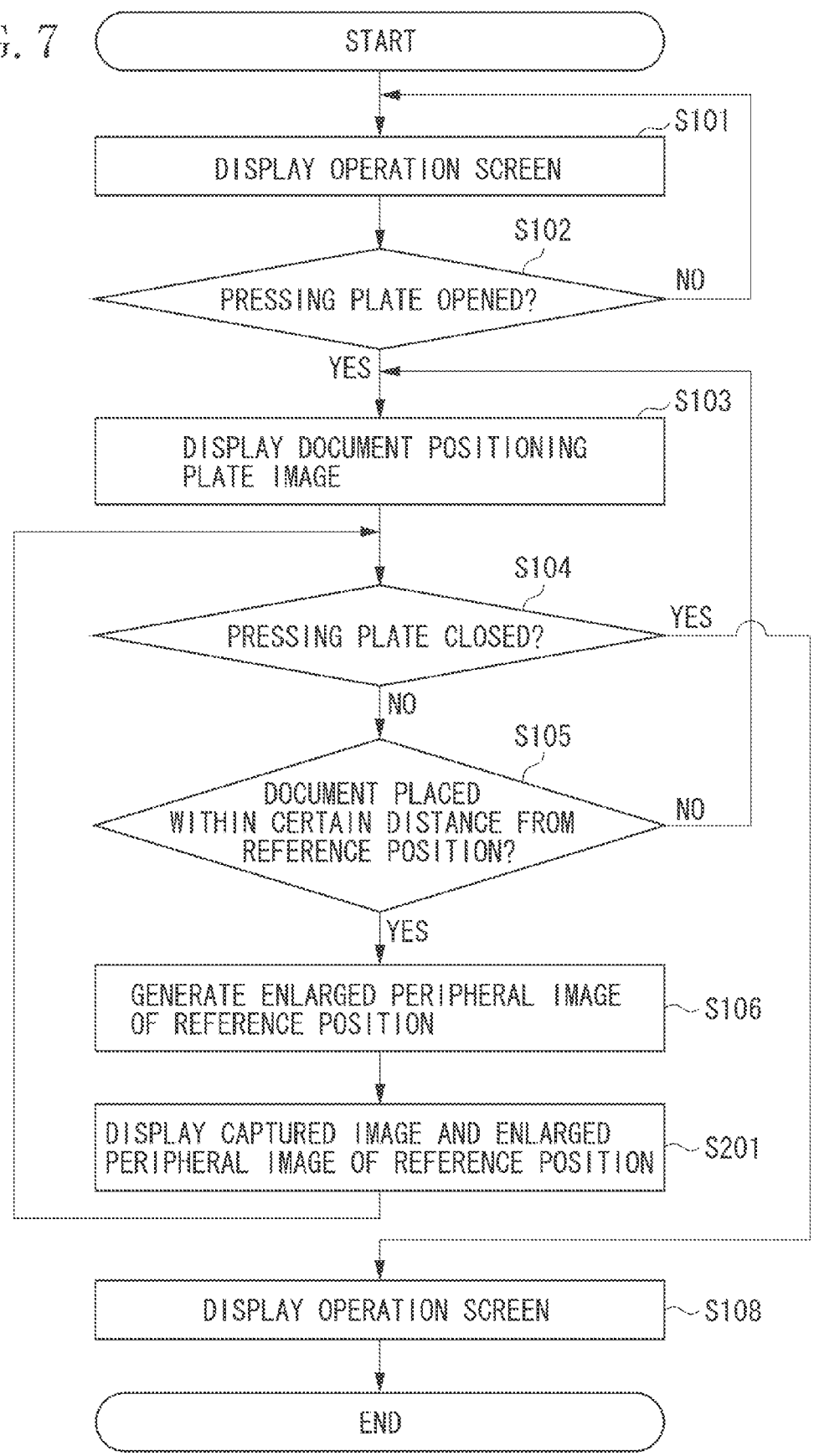

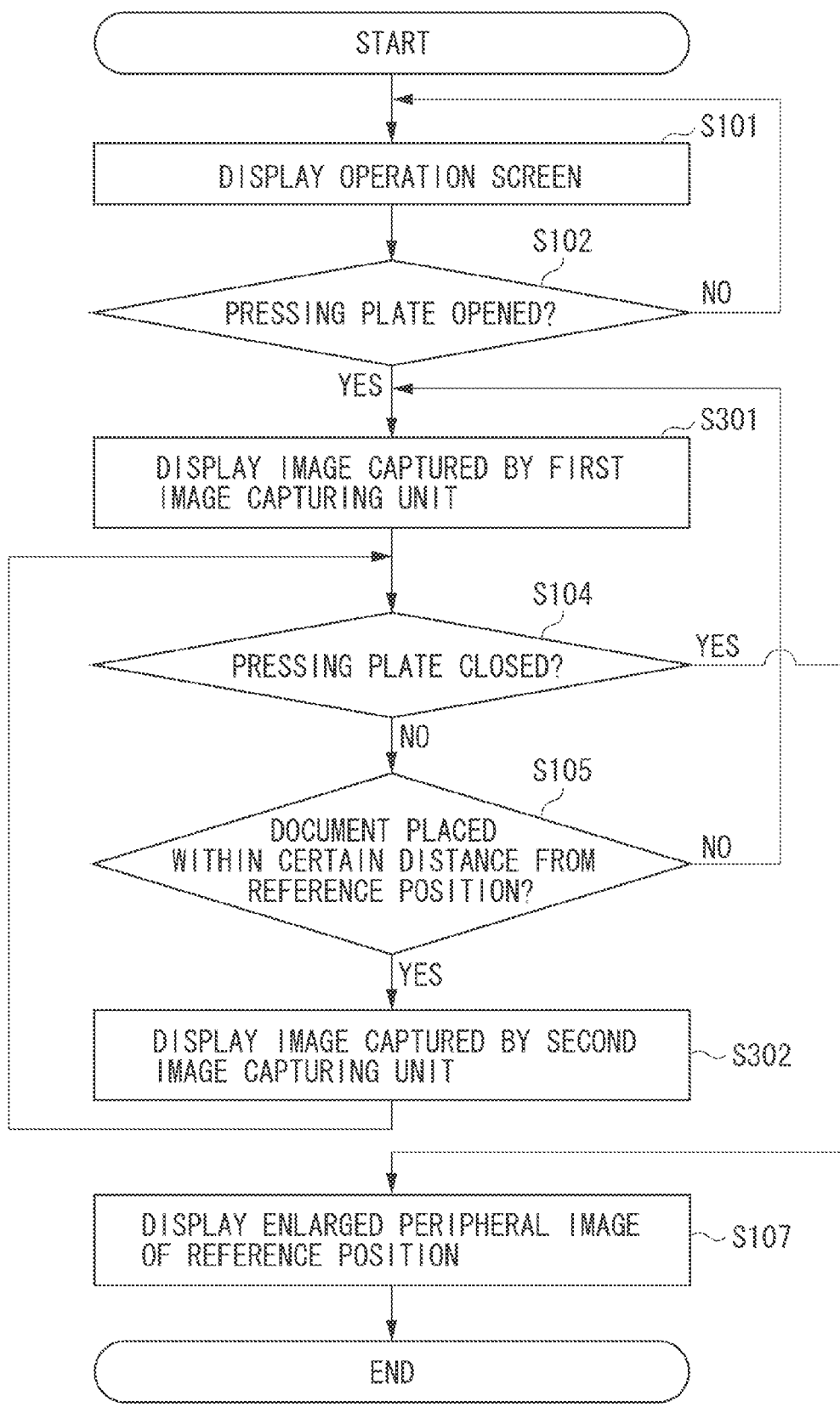

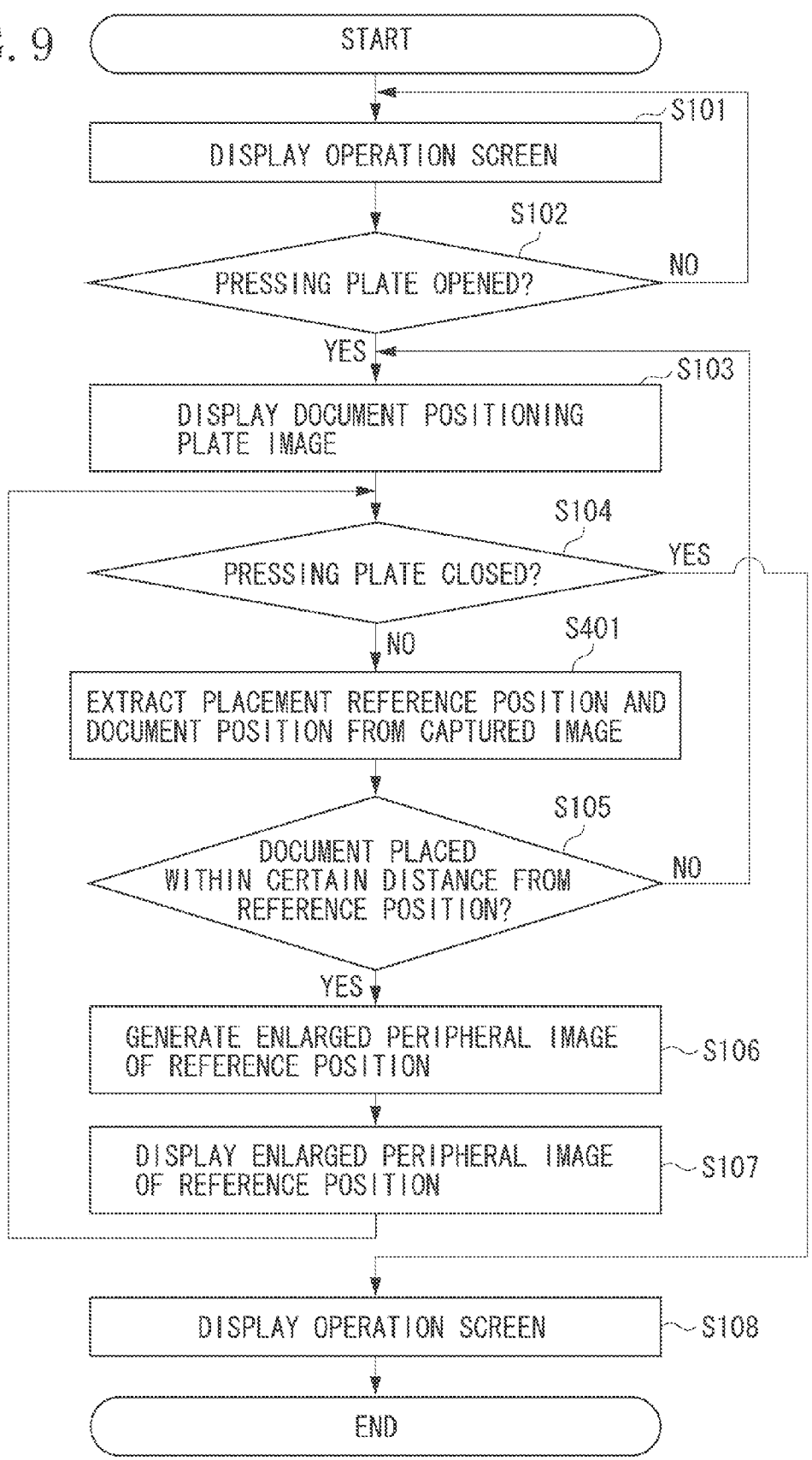

IMAGE READING APPARATUS, CONTROL METHOD OF IMAGE READING APPARATUS, AND STORAGE MEDIUM

BACKGROUND OF THE INVENTION

1. Field of the Invention

The present invention relates to an image reading apparatus, a control method of the image reading apparatus, and a storage medium.

2. Description of the Related Art

A multi-function peripheral (MFP) including a document reading apparatus is used for copying and scanning a document. A method which employs an auto document feeder (ADF), and a method in which a user places a document on a document positioning plate by opening and closing a pressing plate are provided as methods for reading a document to be copied.

When a document is placed on a document positioning plate by a user, a positional deviation of the document may occur with respect to a reference position of the document positioning plate. If such a positional deviation occurs on the document when it is placed, the positional deviation may be reflected in an output image thereof.

In particular, the positional deviation of the document is likely to occur in a case where a user whose eye level is lower than a height of the document positioning plate, such as a user in a wheelchair, places a document on the document positioning plate because it is difficult for the user to check a state of the document that is placed on the document positioning plate. Likewise, checking whether the document is properly placed on the document positioning plate may be difficult for a user who is short in height.

As a measure for preventing a positional deviation of a document which occurs when the document is placed on the document positioning plate, a technique for capturing an image of a state of a document placed on the document positioning plate and displaying the image on an operation unit to reduce a miscopy of the document is discussed in Japanese Patent Application Laid-Open No. 2004-219722. Japanese Patent Application Laid-Open No. 2004-219722 also discusses a technique for displaying the image of the placed document on a screen by reflecting a setting condition (e.g., enlargement/reduction of an image) therein, and a technique for displaying the screen by superimposing a scale mark thereon.

However, if an image of the entire document is displayed when the user places the document on the document positioning plate, the user may not be able to place the document properly with respect to a placement reference position of the document positioning plate. Further, if a part of the document is enlarged and displayed, the user cannot check information about a region other than a region that is enlarged and displayed on the screen, and user convenience may be deteriorated.

SUMMARY OF THE INVENTION

According to an aspect of the present invention, an image reading apparatus for reading a document placed on a document positioning plate includes an acquiring unit configured to acquire an image of an image-readable region including the document positioning plate, a display unit configured to display the image acquired by the acquiring unit, a detecting unit configured to detect a document to be read in a vicinity of a reference position for reading the document which is placed on the document positioning plate, and a control unit configured to control the display unit to display an image of a first region of the document positioning plate in a case where the document is not detected by the detecting unit, and control the display unit to display an image of a second region in the vicinity of the reference position in a magnification that is greater than a magnification for displaying the image of the first region in a case where the document is detected by the detecting unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a flowchart illustrating a control method of the document reading apparatus.

FIG. 8 is a flowchart illustrating a control method of the document reading apparatus.

FIG. 9 is a flowchart illustrating a control method of the document reading apparatus.

DESCRIPTION OF THE EMBODIMENTS

Various exemplary embodiments, features, and aspects of the invention will be described in detail below with reference to the drawings.

<Description of System Configuration>

Figure 1:
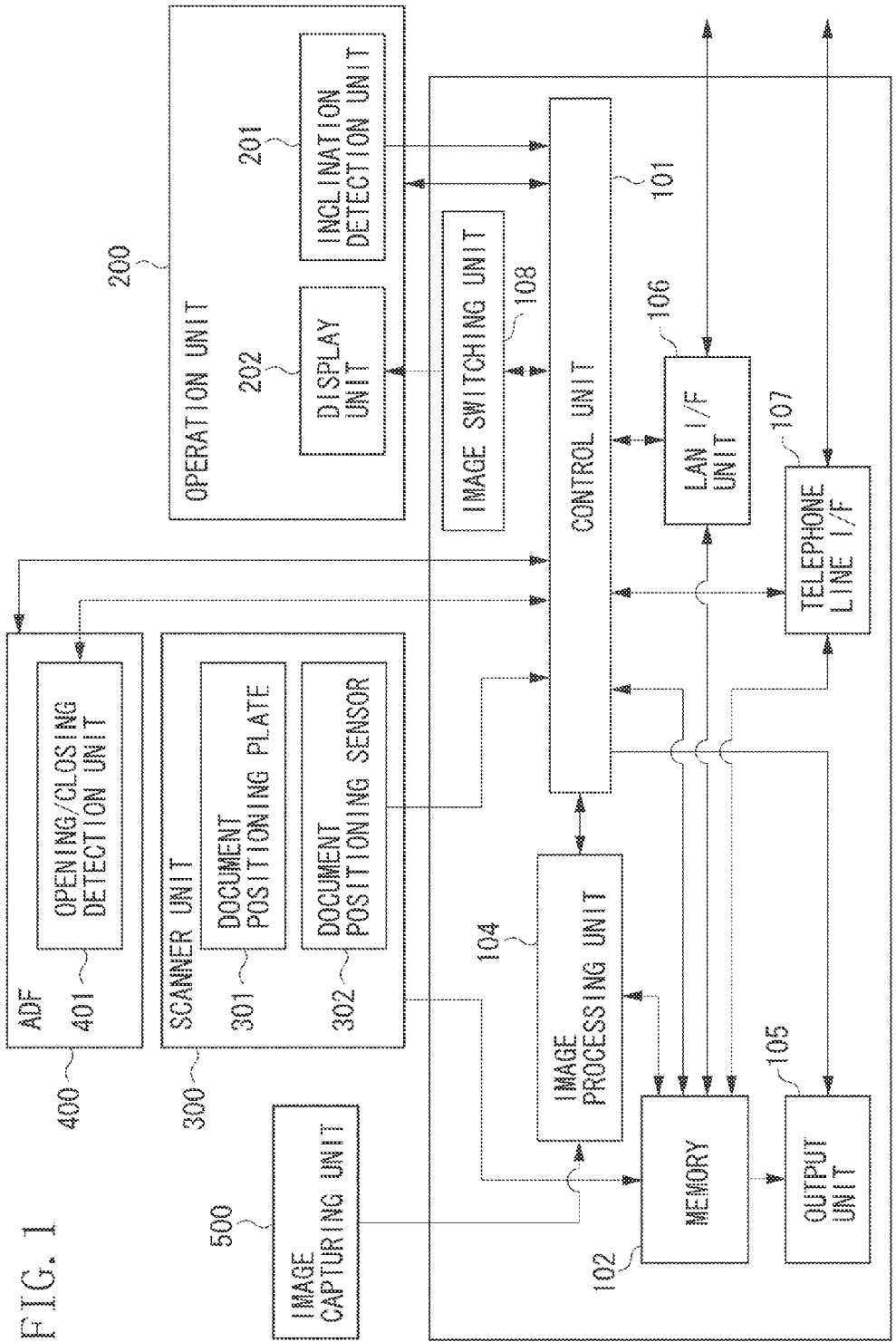
FIG. 1 is a block diagram illustrating a configuration of an image reading apparatus.

FIG. 1 is a block diagram illustrating a configuration of an image reading apparatus according to a first exemplary embodiment. The image reading apparatus according to the present exemplary embodiment is configured in such a manner that a user can freely set a document reading mode by switching between a feeding-reading mode in which the image reading apparatus reads a document fed by the ADF, and a mode in which the image reading apparatus reads a document placed on a predetermined reference position by opening and closing a pressing plate. However, the constituent elements described in exemplary embodiments are not intended to limit the scope of the present invention unless otherwise specified. Herein, a configuration of a multi-function peripheral (MFP) compatible with network according to the first exemplary embodiment of the present invention will be described with reference to FIG. 1.

According to the first exemplary embodiment, if a user opens a pressing plate of a document positioning plate 301 of the MFP, a control unit 101 controls a display unit 202 provided on an operation unit 200 to display a state of a document positioning plate 301, i.e., a state of an entire document-readable region (first region) of the document positioning plate 301, which is captured by an image capturing unit 500 described below. Further, if a document positioning sensor 302 described below detects that the document is placed within a certain distance from a placement reference position, the control unit 101 controls the display unit 202 to switch a display content. Thus, the display unit 202 enlarges and displays a peripheral region of the placement reference position (a second region) of the document positioning plate 301.

The control unit 101 executes a control program stored in a memory 102, and performs an operational control of each unit illustrated in FIG. 1. The control unit 101 includes a central processing unit (CPU). The operation unit 200 includes the display unit 202 including a touch panel. The display unit 202 displays various types of user interface (UI) screens, and receives an operational input from a user with respect to the MFP via the touch panel. Further, the display unit 202 displays an image captured by the image capturing unit 500 described below. The operation unit 200 transmits an instruction received from the user via the touch panel to the control unit 101.

In addition to the display panel 202 including the touch panel, the operation unit 200 includes hard keys. Therefore, the operation unit 200 can also receive an operational input from a user via the hard keys.

A scanner unit 300 reads a document, and generates an image data of the document.

When the scanner unit 300 reads a document, the following modes are provided as reading methods, that is a mode in which the scanner unit 300 reads a document placed on an ADF 400, and a mode in which the scanner unit 300 reads a document that is directly placed on a predetermined reference position of the document positioning plate 301 by the user. The ADF 400 also serves as a pressing plate for pressing and fixing a document placed on the document positioning plate 301.

In the mode in which a document placed on the ADF 400 is read, the control unit 101 controls the ADF 400 to feed the documents placed thereon one by one, so that the scanner unit 300 reads the fed document. An opening/closing detection unit 401 detects whether the pressing plate is opened, and transmits a detection signal to the control unit 101. When a document is placed on the document positioning plate 301, the document positioning sensor 302 detects whether the document is placed within a certain distance from the placement reference position, and transmits a detection signal to the control unit 101.

The memory 102 stores a document image, a captured image captured by the image capturing unit 500, a control program, and the like. An output unit 105 functions as a print engine which prints the document image when the document image is read out from the memory 102.

A local area network interface (LAN I/F) unit 106 can receive a printing job by communicating with an information processing apparatus and a server apparatus via a network, which are not illustrated. A telephone line I/F unit 107 transmits and receives the document image to/from an external facsimile apparatus and other MFP via a telephone line, which are not illustrated. The image capturing unit 500 includes an image sensor. The image capturing unit 500 captures an image of the document positioning plate 301, performs photoelectric conversion, and outputs image information to an image processing unit 104.

The image processing unit 104 performs image processing to convert the image information captured by the image capturing unit 500 into an image to be displayed on the display unit 202. For example, the image processing unit 104 converts the image captured by the image capturing unit 500 into an image format that can be displayed on the display unit 202. Further, the image processing unit 104 can enlarge, reduce, and synthesize images. The display unit 202 can display a captured image into a color image or a monochrome image. An image switching unit 108 switches the display on the display unit 202 between an operation screen for receiving a user operation and the image captured by the image capturing unit 500 according to an instruction from the control unit 101.

Figure 2A:
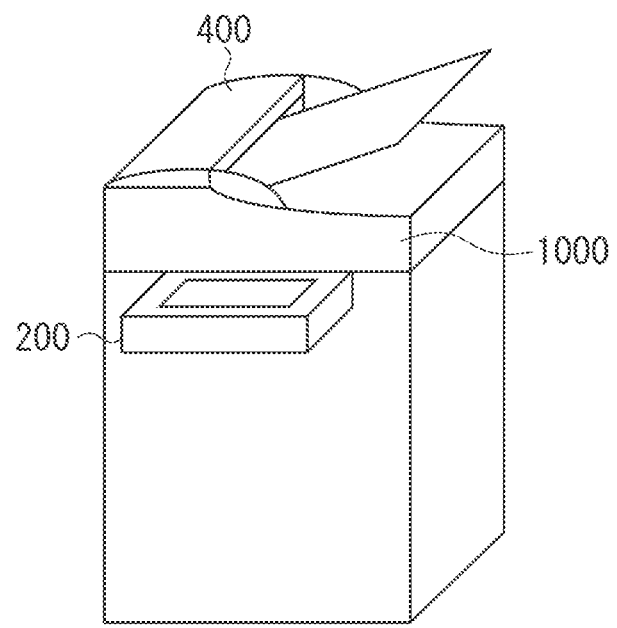
FIGS. 2A and 2B are perspective views illustrating exterior views of the image reading apparatus in FIG. 1.
Figure 2B:
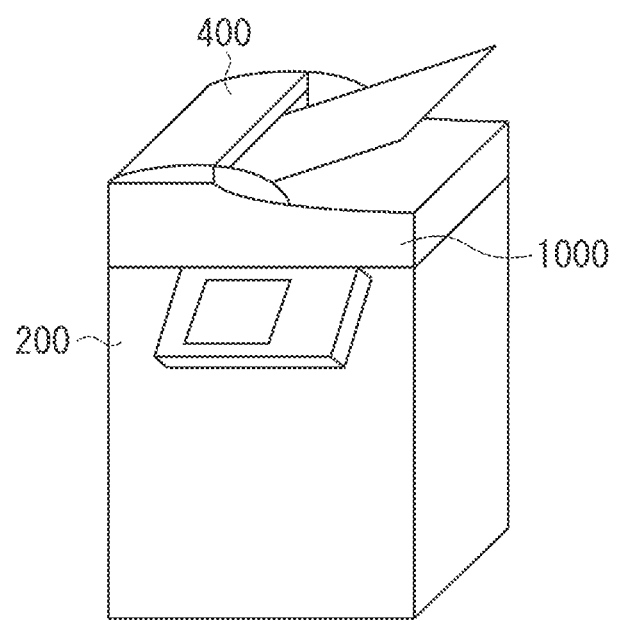

As illustrated in FIGS. 2A and 2B, the operation unit 200 is rotatably disposed on the side surface of the apparatus main body by using one end portion thereof as a supporting point. In addition, the operation unit 200 can be held in an inclined state at a desired inclination angle.

FIG. 2A illustrates a state where the operation unit 200 is horizontally held with respect to the side surface of the apparatus main body. FIG. 2B illustrates a state where the operation unit 200 is pushed downward around the one end thereof, serving as the supporting point, on the apparatus main body side and held in a predetermined inclined state. Since the operation unit 200 can be held in the state illustrated in FIG. 2B, a user who operates the image reading apparatus can see the display unit 202 of the operation unit 200 if the user is in a wheelchair. Further if a user is short in height and his/her eye level is lower than a level of the operation unit 200, the user can see the display unit 202 of the operation unit 200. The operation unit 200 may be disposed on the apparatus main body in a detachable manner. The image reading apparatus may be configured to transfer information displayed on a display screen of the display unit 202 (by wired or by wireless) to an information terminal carried by the user to be displayed thereon.

An inclination detection unit 201 detects whether the operation unit 200 is in an inclined state or not. For example, the inclination detection unit 201 detects whether the user sets the operation unit 200 in the state as illustrated in FIG. 2A or the state illustrated in FIG. 2B. The inclination detection unit 201 may detect whether the operation unit 200 is inclined by an inclination angle other than the inclination angles illustrated in FIGS. 2A and 2B.

FIGS. 3A through 3D are perspective views illustrating variations of installation locations of the image capturing unit 500 illustrated in FIG. 1.

Figure 3A:
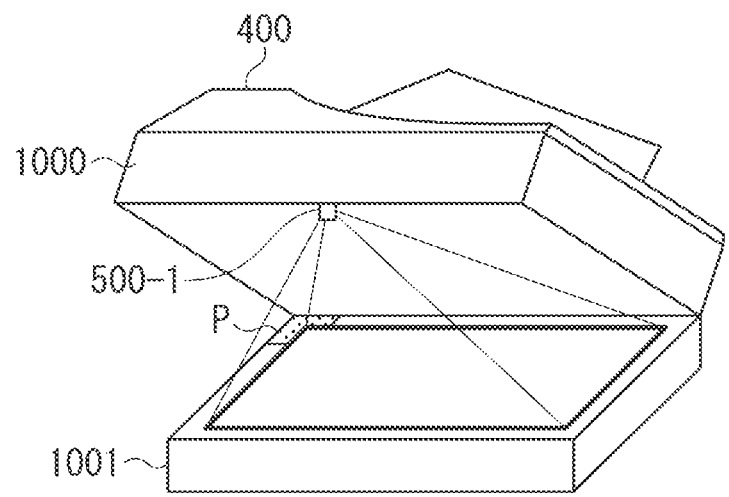
FIGS. 3A through 3D are perspective views illustrating variations of installation locations for an image capturing unit illustrated in FIG. 1.
Figure 3B:
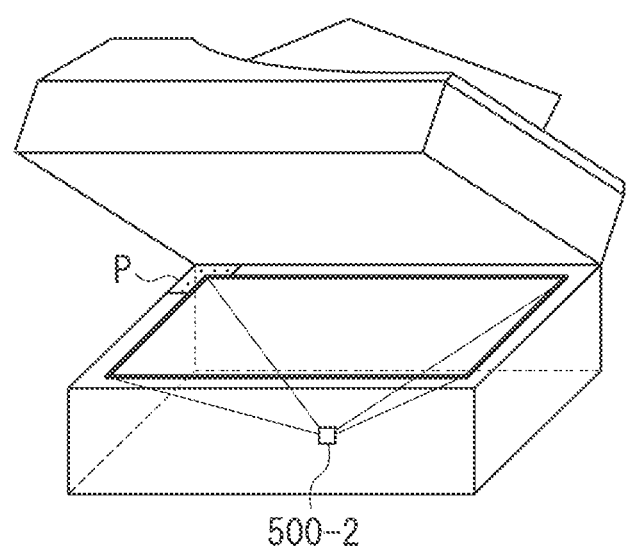
Figure 3C:
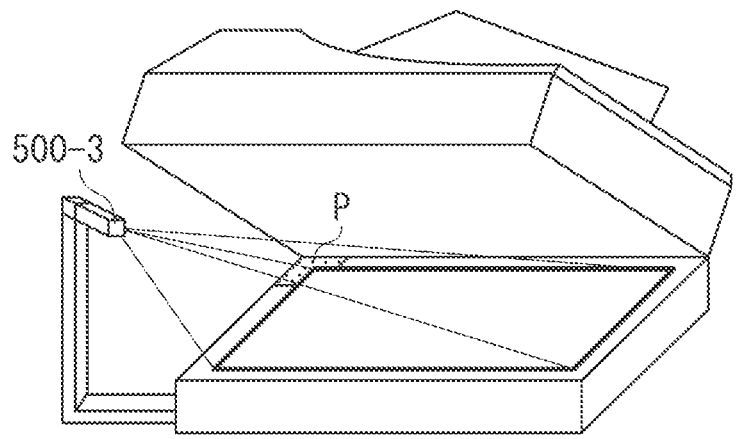
Figure 3D:
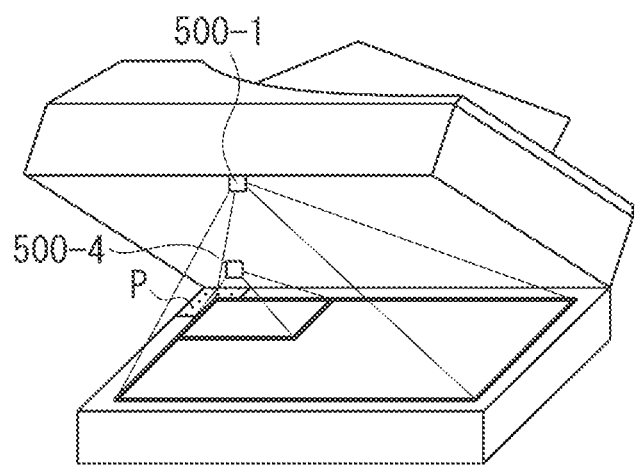

In FIG. 3A, an image capturing unit 500-1 is disposed near a central portion of a front side of a pressing plate 1000 which is opened and closed so as to capture an image of the document positioning plate 301 of the scan unit 1001 from the central portion thereof. In FIG. 3B, an image capturing unit 500-2 is disposed within the scan unit 1001 so as to capture an image of the document positioning plate 301 from a bottom side of a document positioning glass. In FIG. 3C, an image capturing unit 500-3 is disposed on a movable arm extending from the side surface of the apparatus main body so as to capture an image of the document positioning plate 301 from the movable arm. The image capturing unit 500 can be disposed on any location as long as an image of the document positioning plate 301 can be captured. FIG. 3D will be described in another exemplary embodiment.

When a user opens the pressing plate 1000 of the MFP and places a document on the document positioning glass 2001 to cause the MFP to read the document, control to be performed to cause the image capturing unit 500 to capture an image of the document placed on the document positioning plate 301 and display the placement state thereof on the display unit 202 will be described.

Figure 4:
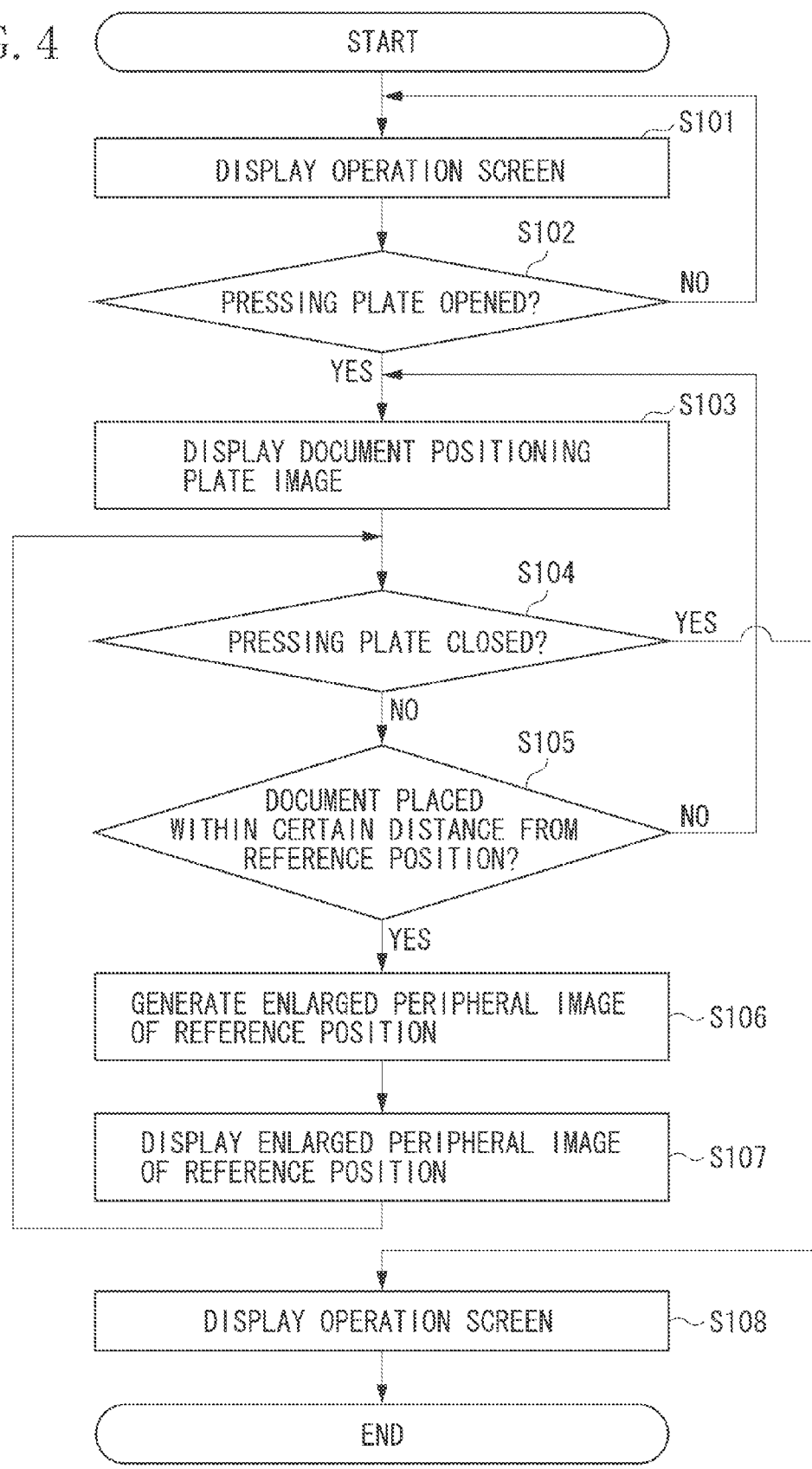
FIG. 4 is a flowchart illustrating a control method of a document reading apparatus according to an exemplary embodiment.

FIG. 4 is a flowchart illustrating a control method of a document reading apparatus according to the present exemplary embodiment. The present exemplary embodiment handles the control processing for guiding and displaying a placement state of a document to be read when a specific user opens the pressing plate 1000 and places the document on the document positioning glass 2001. The present exemplary embodiment assumes a case in which "the specific user", such as a user in a wheelchair whose eye level is lower than the installation position of the document positioning plate 301, operates the document reading apparatus while the user is in the wheelchair.

The control unit 101 executes the control program stored in the memory 102, and realizes each step of the control processing. The control processing for capturing an image of the entire document positioning plate 301 and displaying it on the display unit 202 after the user opens the pressing plate 1000 of the MFP, and for switching the display to enlargement display of a peripheral image of the placement reference position when the user brings the document close to within a certain distance from the placement reference position of the document positioning plate 301 will be described in detail below. A placement reference position in an upper left portion of the document positioning plate 301 is taken as an example.

Figure 5A:
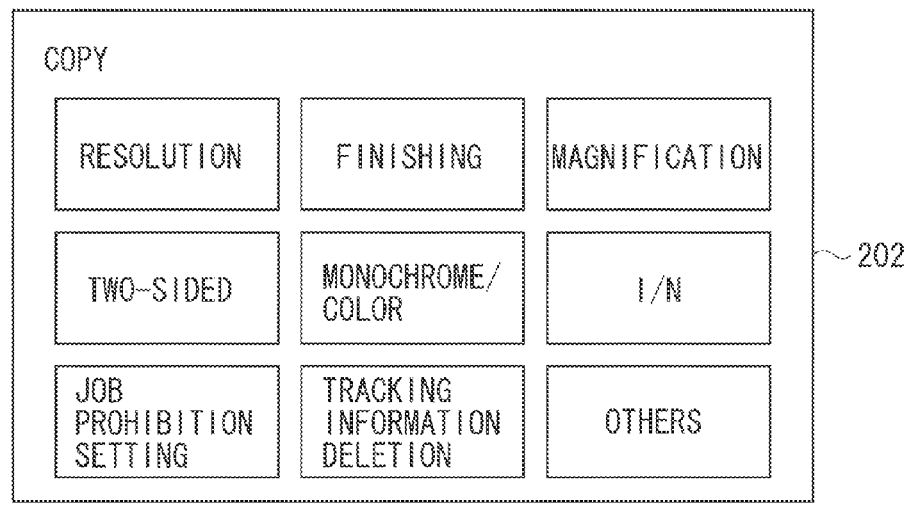
FIGS. 5A through 5E illustrate examples of user interface (UI) screens displayed on a display unit illustrated in FIG. 1.

In step S101, the control unit 101 displays an operation screen on the display unit 202. An example of the operation screen is illustrated in FIG. 5A. In step S102, based on a detection signal from the opening/closing detection unit 401, the control unit 101 determines whether the pressing plate 1000 is opened. As long as opening and closing of the pressing plate 1000 can be detected, the opening/closing detection unit 401 may employ any detection method such as an optical sensor or a switch to be automatically pressed when the pressing plate 1000 is closed toward the document positioning plate 301.

Figure 5B:
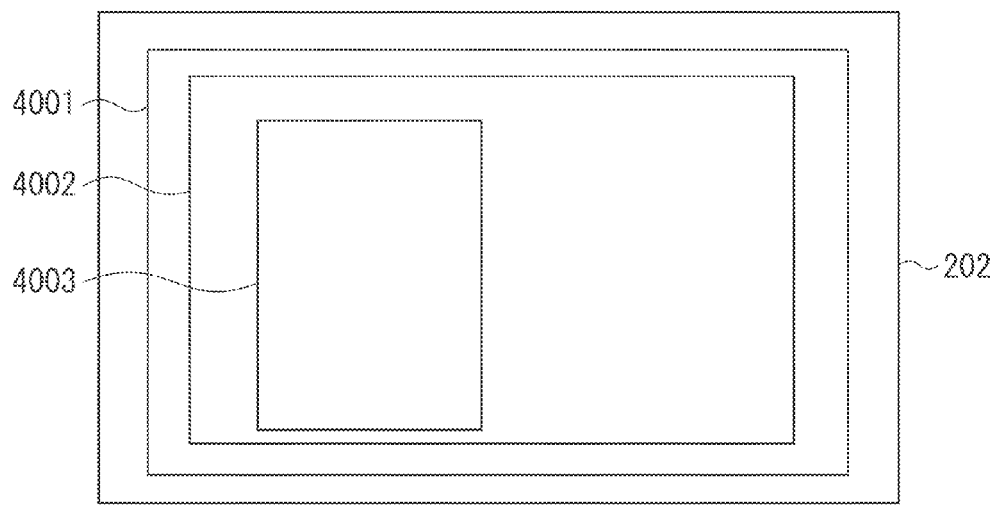

In step S102, when the control unit 101 determines that the pressing plate is not opened (NO in step S102), the processing returns to step S101, and the display unit 202 displays the operation screen in step S101 continuously. If the control unit 101 determines that the pressing plate 1000 is opened (YES in step S102), the control unit 101 causes the image processing unit 104 to perform image processing on the image of the document positioning plate 301 captured by the image capturing unit 500. Then, in step S103, the control unit 101 transmits an instruction to the image switching unit 108, and causes the image switching unit 108 to switch the image displayed on the display unit 202 to the image captured by the image capturing unit 500. FIG. 5B illustrates an example of a state where the image of the entire document positioning plate 301 captured by the image capturing unit 500 is displayed on the display unit 202. In FIG. 5B, documents 4001 through 4003 exemplify documents in various sizes placed on the document positioning plate 301.

In step S104, based on a detection signal from the opening/closing detection unit 401, the control unit 101 determines whether the pressing plate 1000 is closed. If the control unit 101 determines that the pressing plate 1000 is closed (YES in step S104), the processing proceeds to step S108. In step S108, the control unit 101 causes the display unit 202 to switch a display screen and display the operation screen as illustrated in FIG. 5A.

If the control unit 101 determines that the pressing plate 1000 is not closed (NO in step S104), the processing proceeds to step S105. In step S105, while the control unit 101 determines that the pressing plate 1000 is not closed, the control unit 101 determines whether the document is placed within a certain distance from a placement reference position P based on a detection signal from the document positioning sensor 302.

Figure 6A:
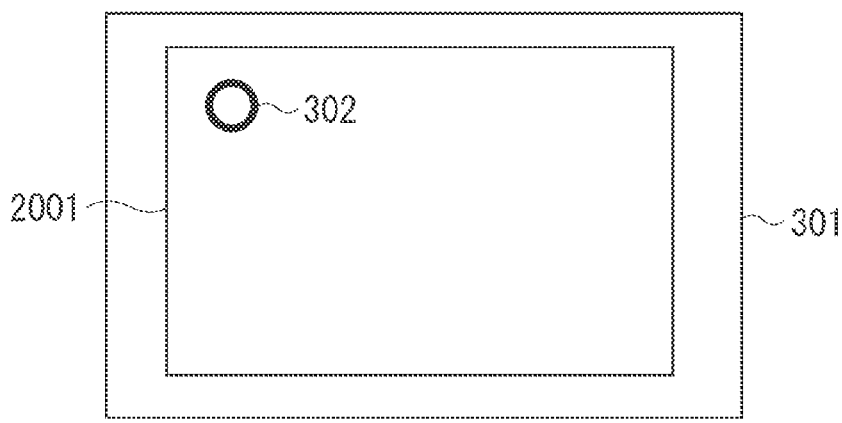
FIGS. 6A through 6C are plan views of a document positioning plate illustrated in FIG. 1.
Figure 6B:
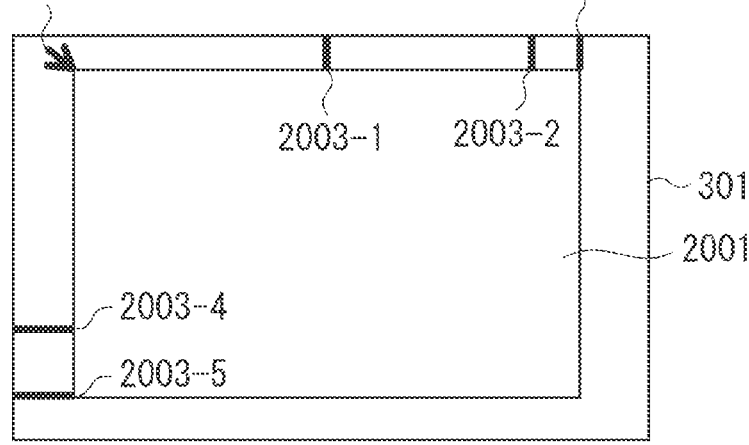
Figure 6C:
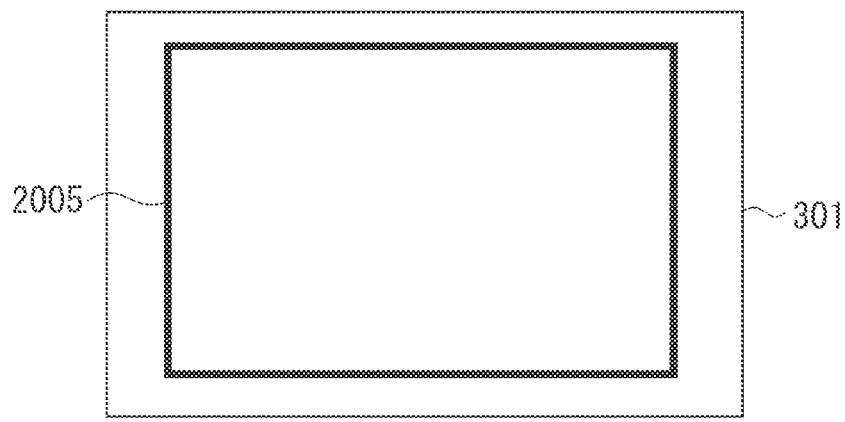

FIGS. 6A through 6C are plan views of the document positioning plate 301 illustrated in FIG. 1. In FIG. 6A, the document positioning sensor 302 is disposed on a bottom surface side of the document positioning glass 2001 of the document positioning plate 301.

As illustrated in FIG. 6A, the document positioning sensor 302 is disposed in a vicinity of the left portion of the document positioning glass 2001 so as to detect whether the document is close to the reference position (placement reference position P) where the document to be placed on the document positioning plate 301 of the scanner unit 300. The document positioning sensor 302 is disposed on the bottom surface side of the document positioning glass 2001. Any type of sensor such as an optical sensor, an infrared sensor, and the like can be employed as the document positioning sensor 302 as long as the sensor can detects whether the document is close to the placement reference position P.

Next, in step S105, if the control unit 101 determines that the document is not placed within the certain distance from the placement reference position P (NO in step S105), the processing returns to step S103, and the control unit 101 causes the display unit 202 to display the image of the document positioning plate 301 continuously.

On the other hand, if the control unit 101 determines that the document is placed within the certain distance from the placement reference position P (YES in step S105), the processing proceeds to step S106. In step S106, the control unit 101 causes the image processing unit 104 to perform image processing for enlarging the peripheral image of the placement reference position P captured by the image capturing unit 500. Accordingly, an enlarged peripheral image of the placement reference position P is generated.

Figure 5C:
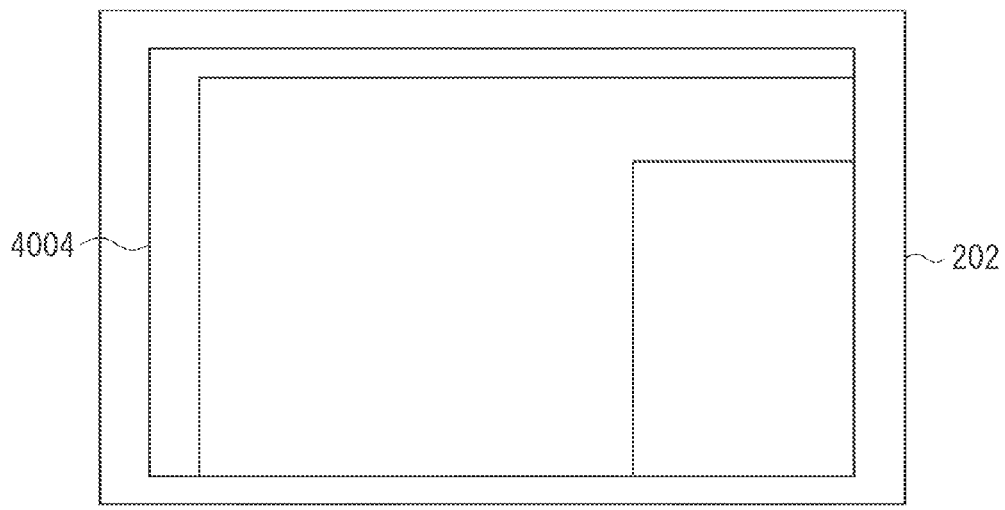

In step S107, the control unit 101 controls the image switching unit 108 to display the enlarged peripheral image of the placement reference position P on the display unit 202. FIG. 5C is an example of a screen 4004 of a state where the enlarged peripheral image of the placement reference position P is displayed.

According to the above-described processing, if it is difficult for a user in a wheelchair to check the placement reference position P of the document positioning plate 301, the state of the document displayed on the display unit 202 can be switched as the document approaches the placement reference position P from the state away from the placement reference position P. In other words, the user can broadly check the placement state of the document on the document positioning glass 2001 by looking at the display unit 202 when the document is away from the placement reference position P. Further, when the user places the document close to the placement reference position P, the peripheral image of the placement reference position P is automatically displayed on the display unit 202 as an enlarged image. Therefore, the user can finely adjust the placement position of the document by checking the screen displayed on the display unit 202. The same effect as the above can be achieved by a user whose eye level is lower than the document positioning glass.

In the above-described first exemplary embodiment, a case in which an image capturing the document positioning plate 301 is displayed on the display unit 202 when the pressing plate 1000 is opened, and a peripheral image of the placement reference position P is enlarged and displayed on the display unit 202 when the document is close to within a certain distance from the placement reference position P is described. In a second exemplary embodiment, a case in which both of an image of the document positioning plate 301 and an enlarged peripheral image of the placement reference position P are displayed on the display unit 202 when a document is placed within a certain distance from the placement reference position P will be described.

FIG. 7 is a flowchart illustrating a control method of a document reading apparatus according to the present exemplary embodiment. The present exemplary embodiment handles the control processing for guiding and displaying a placement state of a document to be read when a specific user opens the pressing plate 1000 and places the document on the document positioning glass 2001. The present exemplary embodiment assumes a case in which "the specific user", such as a user in a wheelchair whose eye level is lower than the installation position of the document positioning plate 301, operates the document reading apparatus while the user is in the wheelchair.

The control unit 101 executes the control program stored in the memory 102, and realizes each step of the control processing. The control processing for capturing an image of the entire document positioning plate 301 by the image capturing unit 500 and displaying the image on the display unit 202 to be performed after a user opens the pressing plate 1000 of the MFP, and the control processing to be performed for displaying an enlarged peripheral image of the placement reference position P and the image of the entire document positioning plate 301 next to each other are described in detail below. More specifically, the control processing to be performed, when the user brings the document within the certain distance from the placement reference position P, for displaying the enlarged peripheral image of the placement reference position P and the image of the entire document positioning plate 301 next to each other on the display unit 202 is described in detail. The placement reference position in an upper left portion of the document positioning plate 301 is taken as an example. In FIG. 7, the processing similar to that in FIG. 4 is performed in steps S101 through S106 and step S108. Therefore, descriptions thereof will be omitted.

In step S105 in FIG. 7, when the control unit 101 determines that the document is placed within the certain distance from the placement reference position P (YES in step S105), the processing proceeds to step S106. In step S106, the control unit 101 causes the image processing unit 104 to perform image processing for enlarging the peripheral image of the placement reference position P which is captured by the image capturing unit 500, and generates the enlarged peripheral image of the placement reference position P.

In step S201, the control unit 101 controls the image switching unit 108 to display the captured image of the entire document positioning glass 2001 and the enlarged peripheral image of the placement reference position P next to each other on the display unit 202.

After the control unit 101 performs the processing in step S201, the processing proceeds to step S104. The captured image of the entire document positioning glass 2001 and the enlarged peripheral image of the placement reference position P may be displayed next each other as described in the present exemplary embodiment, or these two images may be displayed by overlapping with each other while displaying the enlarged image in the foreground.

Figure 5D:
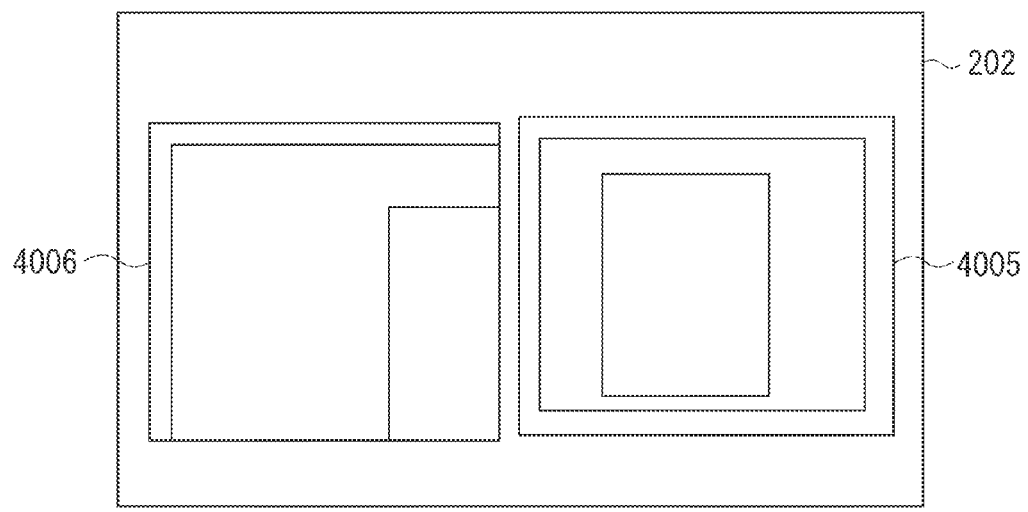
Figure 5E:
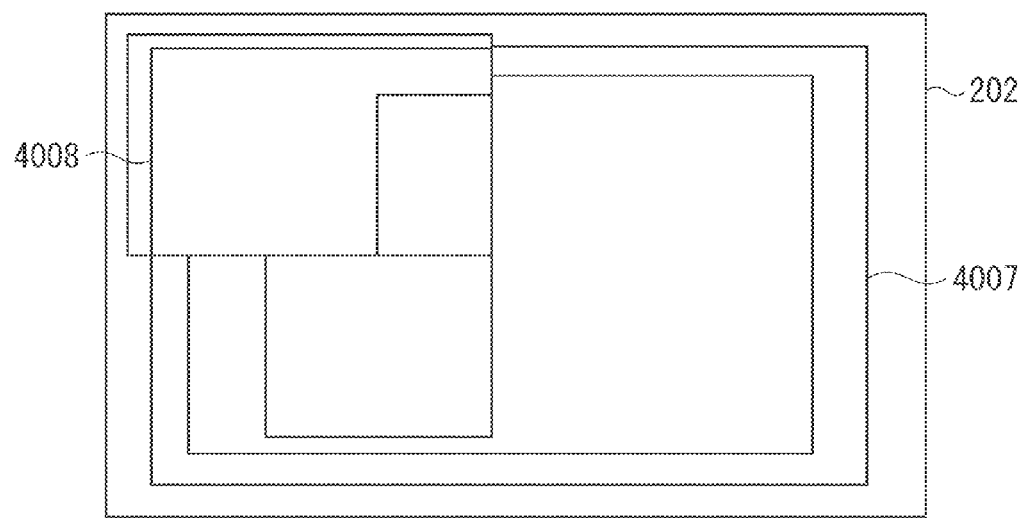

FIGS. 5D and 5E are display examples of the image of document positioning plate 301 and the enlarged peripheral image of the placement reference position P displayed on the display unit 202. In particular, FIG. 5D is the display example where a screen 4005 indicating the image of the document positioning plate 301 and a screen 4006 indicating the enlarged peripheral image of the placement reference position P are displayed next to each other. FIG. 5E is the display example where a screen 4007 indicating the image of the document positioning plate 301 and a screen 4008 indicating the enlarged peripheral image of the placement reference position P are displayed by overlapping with each other. As long as a user can check both of the image of the document positioning plate 301 and the enlarged peripheral image of the placement reference position P, any display method can be employed without limiting to the examples described in the present exemplary embodiment.

According to the present exemplary embodiment, in addition to the effect achieved in the first exemplary embodiment, if it is difficult for a user in a wheelchair to visually check the placement reference position P of the document positioning plate 301, the user can adjust a placement position of a document by checking both the image of the entire document positioning plate 301 and the enlarged image thereof when the user brings the document close to the placement reference position P. Accordingly, visibility and operability of a document can be improved when the user places the document on the document positioning plate 301.

In the above-described first exemplary embodiment, a case in which an image of the document positioning plate 301 is displayed on the display unit 202 when the pressing plate 1000 is opened, and the peripheral image of the placement reference position P is enlarged and displayed on the display unit 202 when the document approaches within a certain distance from the placement reference position P is described. According to a third exemplary embodiment, as illustrated in FIG. 3D, an image reading apparatus includes a first image capturing unit 500-1 for capturing an image of the document positioning plate 301 and a second image capturing unit 500-4 for capturing a peripheral image of the placement reference position P. Processing for switching display before and after a document approaches within the certain distance from the placement reference position P will be described below. The differences between the present exemplary embodiment and the first exemplary embodiment will be described below.

According to the present exemplary embodiment, the first image capturing unit 500-1 for capturing an image of the entire document positioning plate 301 including the placement reference position P and the second image capturing unit 500-4 for capturing a peripheral image of the placement reference position P are disposed on the positions as illustrated in FIG. 3D, in a case of a document is placed on the document positioning glass 2001.

As long as the first image capturing unit 500-1 captures an image of the entire document positioning plate 301 and the second image capturing unit 500-4 captures a peripheral image of the placement reference position P, installation locations for the first image capturing unit 500-1 and the second image capturing unit 500-4 are not limited to the example illustrated in FIG. 3D.

FIG. 8 is a flowchart illustrating a control method of a document reading apparatus according to the present exemplary embodiment. The present exemplary embodiment handles the control processing for guiding and displaying a placement state of a document to be read when a specific user opens the pressing plate 1000 and places the document on the document positioning glass 2001. The present exemplary embodiment assumes a case in which "the specific user", such as a user in a wheelchair whose eye level is lower than the installation position of the document positioning plate 301, operates the document reading apparatus while the user is in the wheelchair.

The control unit 101 executes the control program stored in the memory 102, and realizes each step of the control processing. In FIG. 8, the processing similar to that in FIG. 4 is performed in steps S101, S102, S104, S105, and S107. Therefore, descriptions thereof will be omitted.

The control processing for capturing an image of the entire document positioning plate 301 by the image capturing unit 500-1 and displaying the image on the display unit 202 to be performed after a user opens the pressing plate 1000 of the MFP will be described below. Further, the control processing for capturing a peripheral image of the placement reference position P by the image capturing unit 500-4 and enlarging and displaying the image to be performed when the user brings the document within a certain distance from the placement reference position P of the document positioning plate 301 will be described. The placement reference position in an upper left portion of the document positioning plate 301 is taken as an example.

In step S102, if the control unit 101 determines that the pressing plate 1000 is opened by the user (YES in step S102), the processing proceeds to step S301. In step S301, the control unit 101 displays an image of the entire document positioning plate 301 captured by the first image capturing unit 500-1 on the display unit 202. After the control unit 101 performs the processing in step S301, the processing proceeds to step S104.

In step S105, if the control unit 101 determines that the user brings the document within the certain distance from the placement reference position P (YES in step S105), the processing proceeds to step S302. In step S302, the control unit 101 controls the image switching unit 108 to display the image captured by the second image capturing unit 500-4 as it is on the display unit 202. After the control unit 101 performs the processing in step S302, the processing proceeds to step S104.

According to the present exemplary embodiment, in addition to the effect described in the first exemplary embodiment, an image of the entire document positioning plate 301 captured by the first image capturing unit 500-1 is displayed. In addition, the image processing unit 104 does not perform the image processing for enlarging the image when the user brings the document close to the placement reference position P. However, the user can finely adjust a position of the document placed on the placement reference position P by checking the peripheral image of the placement reference position P captured by the second image capturing unit 500-4.

In the above-described first exemplary embodiment, a case in which an image of the entire document positioning glass 2001 is displayed on the display unit 202 when the pressing plate 1000 is opened, and the peripheral image of the placement reference position P is enlarged and displayed on the display unit 202 when the document positioning sensor 302 detects that the document approaches within a certain distance from the placement reference position P is described. In a fourth exemplary embodiment, processing for determining the placement reference position P from an image of the document positioning plate 301 captured by the image capturing unit 500 without employing the document positioning sensor 302, and processing for displaying an enlarged peripheral image of the placement reference position P when it is determined that the document approaches within a certain distance from the placement reference position P will be described.

FIG. 9 is a flowchart illustrating a control method of a document reading apparatus according to the present exemplary embodiment. The present exemplary embodiment handles the control processing for guiding and displaying a placement state of a document to be read when a specific user opens the pressing plate 1000 and places the document on the document positioning glass 2001. The present exemplary embodiment assumes a case in which "the specific user", such as a user in a wheelchair whose eye level is lower than the installation position of the document positioning plate 301, operates the document reading apparatus while the user is in the wheelchair.

The control unit 101 executes the control program stored in the memory 102, and realizes each step of the control processing. In FIG. 9, the processing similar to that in FIG. 4 is performed in steps S101 through S108. Therefore, descriptions thereof will be omitted.

The control processing for capturing an image of the entire document positioning plate 301 by the image capturing unit 500 and displaying the image on the display unit 202 to be performed after a user opens the pressing plate 1000 of the MFP will be described below. Further, the control processing for enlarging and displaying a peripheral image of the placement reference position P to be performed when it is determined that a user brings a document within a certain distance from the placement reference position P from an analysis result of an image captured by the image capturing unit 500 is described below. The placement reference position in an upper left portion of the document positioning plate 301 is taken as an example.

In step S104 in FIG. 9, when the control unit 101 determines that the pressing plate 1000 is not closed based on a detection signal from the opening/closing detection unit 401 (NO in step S104), the processing proceeds to step S401. In step S401, the control unit 101 causes the image processing unit 104 to perform predetermined image analysis processing with respect to the image captured by the image capturing unit 500. Based on a result of the image analysis processing, the image processing unit 104 extracts an image of the placement reference position P and an image of the placed document. More specifically, the control unit 101 analyzes an image pattern extracted from the captured image, and determines whether the document to be read is placed in the vicinity of the placement reference position P which is set to read the document placed on the document positioning plate 301.

For example, as illustrated in FIG. 6B, marks 2003-1 through 2003-6 related to the positional adjustment of the document are provided on a circumferential area of the document positioning glass 2001 in advance. The image processing unit 104 periodically extracts image feature patterns of the marks 2003-1 through 2003-6 and an edge pattern of the document from image information of the captured image. Accordingly, if the image positioning sensor 302 is not included in the image reading apparatus, the control unit 101 can determine whether the document placed on the document positioning glass 2001 approaches the placement reference position P.

FIG. 6C illustrates an example of a placement frame pattern 2005 provided on the edge portion side of the document positioning glass 2001 instead of the mark 2003-6 provided on the placement reference position P. Accordingly, a feature of the placement frame pattern 2005 can be extracted from the image information of the image captured by the image capturing unit 500. More specifically, a pattern of an upper left portion of the placement frame pattern 2005 which serves as the placement reference position P and an edge pattern of the document are extracted and, the control unit 101 can determine whether the document approaches the placement reference position P.

A position of a document can be identified by extracting a shape of the document (square shape) or a moving image thereof in addition to the above-described extraction of the edge pattern. Accordingly, an extraction method is not limited to the above-described extraction method, and any extraction method can be employed as long as an image of a document placed on the document positioning glass table 2001 can be extracted.

After the control unit 101 performs the processing in step S401, the processing proceeds to step S105. In step S105, the control unit 101 calculates a distance between the placement reference position P and the position of the document as illustrated in FIG. 6B or 6C, and determines whether the document approaches within a certain distance from the placement reference position P. A reference for determining the certain distance is stored in the memory 102 as a threshold value in advance.

According to the present exemplary embodiment, without employing the document positioning sensor 302, a user can adjust a placement position of a document by checking both an image of the entire document positioning plate 301 and an enlarged image thereof when the document approaches the placement reference position P, in a case where it is difficult for the user in a wheelchair to visually check the placement reference position P of the document positioning plate 30. Accordingly, visibility and operability of a document can be improved when the user places the document on the document positioning plate 301.

In the above-described first exemplary embodiment, a case in which an image of the document positioning plate 301 is displayed on the display unit 202 when the pressing plate 1000 is opened by the above-described user, and a peripheral image of the placement reference position P is enlarged and displayed on the display unit 202 when the document approaches the placement reference position P is described. In a fifth exemplary embodiment, processing for displaying an image of the document positioning plate 301 on the display unit 202 only when the image reading apparatus detects that the above-described user inclines the operation unit 200 as illustrated in FIG. 2B will be described.

As illustrated in FIG. 2B, according to the present exemplary embodiment, the operation unit 200 includes a mechanism for rotating the operation unit 200 by using one end portion attached to the apparatus main body as a supporting point, and a mechanism which holds the operation unit 200 in a inclined position that is easy for a user to visually check. In addition, according to the present exemplary embodiment, the operation unit 200 includes an inclination detection unit 201 for detecting an inclined state of the operation unit 200 as illustrated in FIG. 1.

Figure 10:
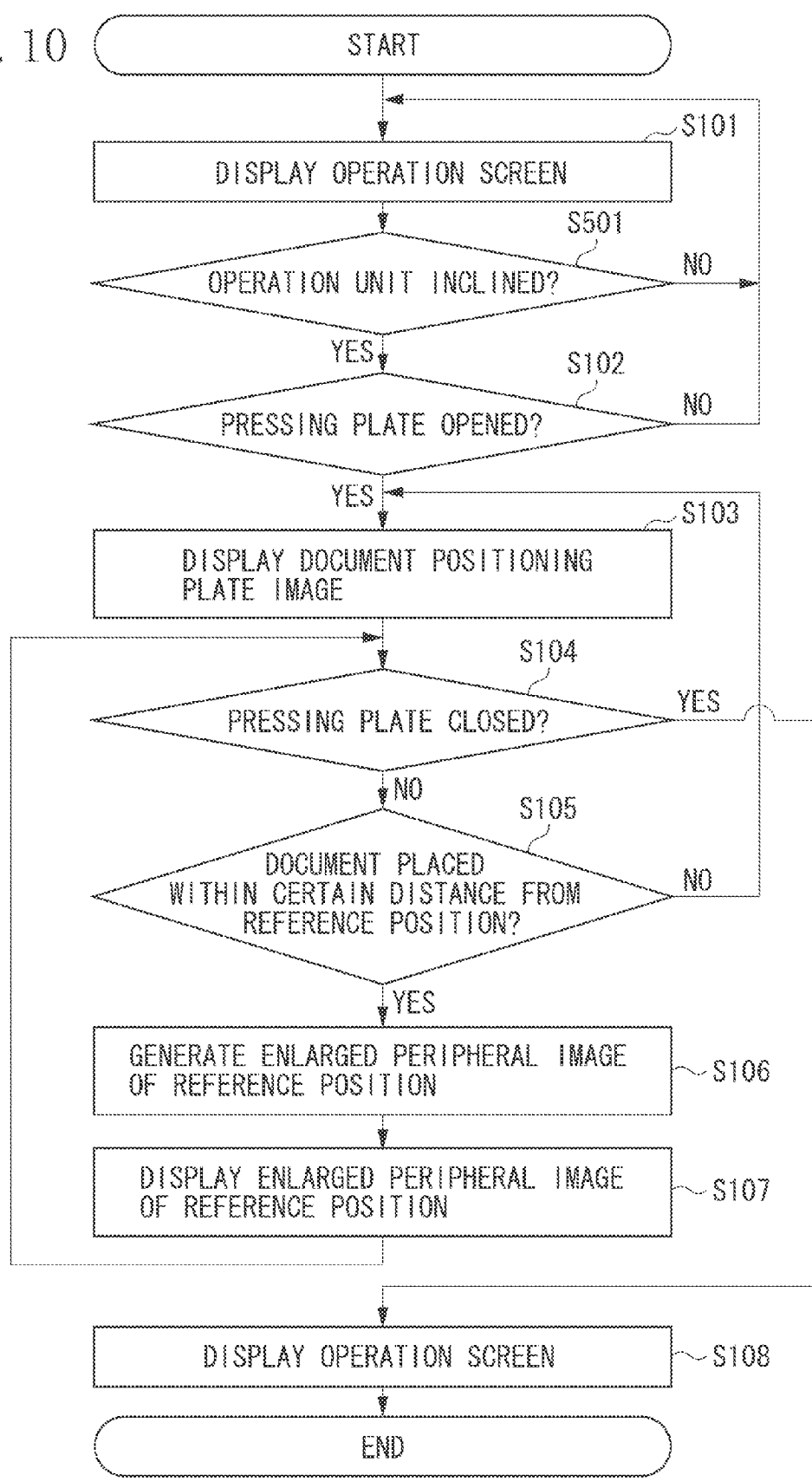
FIG. 10 is a flowchart illustrating a control method of the document reading apparatus.

FIG. 10 is a flowchart illustrating a control method of a document reading apparatus according to the present exemplary embodiment. The present exemplary embodiment handles the control processing for guiding and displaying a placement state of a document to be read when a specific user opens the pressing plate 1000 and places the document on the document positioning glass 2001. The present exemplary embodiment assumes a case in which "the specific user", such as a user in a wheelchair whose eye level is lower than the installation position of the document positioning plate 301, operates the document reading apparatus while the user is in the wheelchair.

The control unit 101 executes the control program stored in the memory 102, and realizes each step of the control processing. In FIG. 10, the processing similar to that in FIG. 4 is performed in steps S101 through S108. Therefore, descriptions thereof will be omitted.

In step S101, the control unit 101 displays the operation screen on the display unit 202. Then, in step S501, based on a detection signal output from the inclination detection unit 201, the control unit 101 determines whether the operation unit 200 is held in an inclined state. The inclination detection unit 201 can employ any detection method such as an optical sensor or a switch to be automatically pressed as long as the inclination of the operation unit 200 can be detected.

If the control unit 101 determines that the operation unit 200 is inclined (YES in step S501), the processing proceeds to step S102. In step S102 and subsequent steps, the control unit 101 performs the similar processing to that in the first exemplary embodiment. In step S501, if the control unit 101 determines that the operation unit 200 is not inclined (NO in step S501) based on the detection signal output from the inclination detection unit 201, the processing returns to step S101, and the display unit 202 displays the operation screen continuously.

According to the present exemplary embodiment, in a case where the operation unit 200 is inclined, the control unit 101 performs the control processing for displaying an image of the document positioning plate 301 on the display unit 202 because the eye level of the user is assumed to be lower than the installation position of the operation unit 200, and thus it is difficult for the user to check the document positioning plate 301 while operating the operation unit 200. On the other hand, in a case where the operation unit 200 is not inclined, the control unit 101 performs the control processing for displaying the operation screen on the display unit 202 without performing the control processing for displaying the image of the document positioning plate 301 on the display unit 202 because the eye level of the user is assumed to be higher than the installation position of the control unit 200. In this manner, the control unit 101 can control the display unit 200 to switch the display screen displayed thereon according to the inclination state of the operation unit 200.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-262209 filed Nov. 30, 2011, which is hereby incorporated by reference herein in its entirety.

What is claimed is:

1. An image reading apparatus for reading a document placed on a document positioning plate, the image reading apparatus comprising:
   an acquiring unit configured to acquire an image of an image-readable region including the document positioning plate;
   a display unit configured to display the image acquired by the acquiring unit;
   a detecting unit configured to detect the document to be read in a vicinity of a reference position for reading the document which is placed on the document positioning plate; and a control unit configured to control the display unit to display an image of a first region of the document positioning plate in a case where the document is not detected by the detecting unit, and control the display unit to display an image of a second region in the vicinity of the reference position in a magnification that is greater than a magnification for displaying the image of the first region in a case where the document is detected by the detecting unit.

2. The image reading apparatus according to claim 1, further comprising:
a pressing plate configured to press the document,
wherein, if the pressing plate is closed, the control unit switches a display content displayed on the display unit from the image acquired by the acquiring unit to an operation screen.

3. The image reading apparatus according to claim 1, wherein the control unit controls the display unit to display the image of the first region of the document positioning plate in a case where the document is not detected by the detection unit, and controls the display unit to display the image of the second region in the vicinity of the reference position and the image of the first region of the document positioning plate in a case where the document is detected by the detection unit.

4. The image reading apparatus according to claim 1, wherein the acquiring unit includes a first acquiring unit configured to acquire the image of the first region of the document positioning plate in a state in which a pressing plate for pressing the document is opened, and a second acquiring unit configured to acquire the image of the second region in the vicinity of the reference position, and
wherein the control unit controls the display unit to display the image of the first region acquired by the first acquiring unit in a case where the document is not detected by the detection unit, and controls the display unit to display the image of the second region in the vicinity of the reference position acquired by the second acquiring unit in a case where the document is detected by the detection unit.

5. The image reading apparatus according to claim 1, wherein the detecting unit analyzes an image pattern extracted from the image acquired by the acquiring unit and detects the document to be read in the vicinity of the reference position for reading the document which is placed on the document positioning plate.

6. A method for controlling an image reading apparatus for reading a document placed on a document positioning plate, the method comprising:
acquiring an image of an image-readable region including the document positioning plate;
detecting the document to be read in a vicinity of a reference position for reading the document which is placed on the document positioning plate; and
controlling a display unit to display an image of a first region of the document positioning plate in a case where the document is not detected, and controlling the display unit to display an image of a second region in the vicinity of the reference position in a magnification that is greater than a magnification for displaying the image of the first region in a case where the document is detected.

7. A computer readable storage medium for storing a computer program that causes an image reading apparatus to execute a method for reading a document placed on a document positioning plate, the method comprising:
acquiring an image of an image-readable region including the document positioning plate;
detecting the document to be read in a vicinity of a reference position for reading the document which is placed on the document positioning plate; and
controlling a display unit to display an image of a first region of the document positioning plate in a case where the document is not detected and to control the display unit to display an image of a second region in the vicinity of the reference position in a magnification that is greater than a magnification for displaying the image of the first region in a case where the document is detected.

* * * * *